United States Patent
Hirabayashi et al.

(10) Patent No.: US 11,492,130 B2
(45) Date of Patent: Nov. 8, 2022

(54) REDUNDANT PROPULSION DEVICE AND ELECTRIC AIRCRAFT

(71) Applicant: SUBARU CORPORATION, Tokyo (JP)

(72) Inventors: Daisuke Hirabayashi, Tokyo (JP); Kazuaki Kotani, Tokyo (JP); Kazushige Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 251 days.

(21) Appl. No.: 16/879,032

(22) Filed: May 20, 2020

(65) Prior Publication Data
US 2021/0039796 A1    Feb. 11, 2021

(30) Foreign Application Priority Data
Aug. 6, 2019    (JP) .............................. JP2019-144102

(51) Int. Cl.
| | | |
|---|---|---|
| *B64D 27/24* | (2006.01) | |
| *B64D 35/08* | (2006.01) | |
| *B64C 7/02* | (2006.01) | |
| *B64D 33/08* | (2006.01) | |

(52) U.S. Cl.
CPC ............. *B64D 27/24* (2013.01); *B64D 35/08* (2013.01); *B64C 7/02* (2013.01); *B64D 33/08* (2013.01)

(58) Field of Classification Search
CPC ........ B64D 27/24; B64D 33/08; B64D 35/08; B64C 7/02
USPC .......................................................... 244/55
See application file for complete search history.

(56) References Cited

U.S. PATENT DOCUMENTS

| | | | | |
|---|---|---|---|---|
| 4,709,882 | A * | 12/1987 | Galbraith ................ | B64C 27/12 429/513 |
| 10,040,566 | B2 * | 8/2018 | Waltner .................. | B64D 31/06 |
| 10,377,500 | B2 * | 8/2019 | Kobayashi ............. | B64D 27/24 |
| 2003/0230671 | A1 * | 12/2003 | Dunn ...................... | B64D 27/24 244/53 R |
| 2008/0150454 | A1 | 6/2008 | Ito et al. | |
| 2012/0209456 | A1 * | 8/2012 | Harmon ................. | B64D 35/08 903/903 |
| 2012/0282103 | A1 * | 11/2012 | Muren .................... | B64C 27/68 416/205 |
| 2013/0231208 | A1 * | 9/2013 | Buono ................... | B64D 27/24 475/5 |
| 2015/0093272 | A1 * | 4/2015 | Komer ................... | B64C 11/44 417/423.1 |

(Continued)

FOREIGN PATENT DOCUMENTS

| | | |
|---|---|---|
| JP | 2007-325479 A | 12/2007 |
| JP | 2010-041747 A | 2/2010 |

*Primary Examiner* — Brady W Frazier
(74) *Attorney, Agent, or Firm* — McDermott Will & Emery LLP

(57) ABSTRACT

A redundant propulsion device includes a propeller and electric motors. The electric motors are configured to drive the propeller. The electric motors are disposed with respect to a propeller shaft of the propeller so that, around the propeller shaft, at least one of the electric motors is disposed at each of the locations in the longitudinal direction of the propeller shaft. The electric motors are disposed at positions such that an output shaft of each of the electric motors does not overlap an output shaft of any other one of the electric motors as viewed in the longitudinal direction of the propeller shaft from the propeller.

20 Claims, 10 Drawing Sheets

(56) References Cited

U.S. PATENT DOCUMENTS

| | | | |
|---|---|---|---|
| 2017/0190435 A1* | 7/2017 | Kobayashi | H02P 29/10 |
| 2017/0217600 A1* | 8/2017 | Regev | B64D 35/02 |
| 2018/0044029 A1* | 2/2018 | Koegler | B64F 5/10 |
| 2018/0251226 A1* | 9/2018 | Fenny | F01D 15/10 |
| 2019/0084684 A1* | 3/2019 | Eller | B64D 27/24 |
| 2019/0135427 A1* | 5/2019 | Robertson | B64C 11/28 |
| 2019/0193835 A1* | 6/2019 | Sandberg | B64C 11/34 |
| 2019/0322379 A1* | 10/2019 | Mackin | F02C 7/057 |
| 2019/0344877 A1* | 11/2019 | Gilliland | B64D 35/08 |
| 2020/0358338 A1* | 11/2020 | Pal | F01D 25/12 |
| 2020/0361622 A1* | 11/2020 | Groninga | B64C 27/14 |

\* cited by examiner

REDUNDANT PROPULSION DEVICE AND ELECTRIC AIRCRAFT

CROSS-REFERENCE TO RELATED APPLICATIONS

The present application claims priority from Japanese Patent Application No. 2019-144102 filed on Aug. 6, 2019, the entire contents of which are hereby incorporated by reference.

BACKGROUND

The present disclosure relates to a redundant propulsion device in which a plurality of electric motors drive a propeller and relates to an electric aircraft including the redundant propulsion device.

In an electric aircraft that obtains a propulsive force by using a propeller that is driven by an electric motor, a plurality of electric motors are easily provided.

Thus, it is relatively easy to constitute a propulsion device that has redundancy by including a plurality of electric motors configured to drive a propeller (hereinafter, referred to as a redundant propulsion device).

Regarding a way of providing a plurality of electric motors, for example, as Japanese Unexamined Patent Application Publication (JP-A) No. 2010-41747 and JP-A No. 2007-325479 describe, a way in which a plurality of electric motors are disposed around an output shaft in the circumferential direction of the output shaft (hereinafter, referred to as a radial arrangement) is known.

A way in which a plurality of electric motors are disposed in series (hereinafter, referred to as an axial arrangement) is also known.

SUMMARY

An aspect of the disclosure provides a redundant propulsion device including a propeller and electric motors configured to drive the propeller. The electric motors are disposed with respect to a propeller shaft of the propeller so that, around the propeller shaft, at least one of the electric motors is disposed at each of locations in a longitudinal direction of the propeller shaft. The motors are disposed at positions such that an output shaft of each of the electric motors does not overlap an output shaft of any other one of the electric motors as viewed in the longitudinal direction of the propeller shaft from the propeller.

An aspect of the disclosure provides a redundant propulsion device including a propeller and electric motors configured to drive the propeller. The electric motors are disposed with respect to a propeller shaft of the propeller at locations in a longitudinal direction of the propeller shaft, one of the electric motors is directly coupled to the propeller shaft of the propeller at one of the locations, and at least one of the electric motors is disposed around the propeller shaft at another one of the locations. The electric motors are disposed at positions such that an output shaft of each of the electric motors does not overlap an output shaft of any other one of the electric motors as viewed in the longitudinal direction of the propeller shaft from the propeller.

An aspect of the disclosure provides an electric aircraft including either one of the above-described redundant propulsion device.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 10:
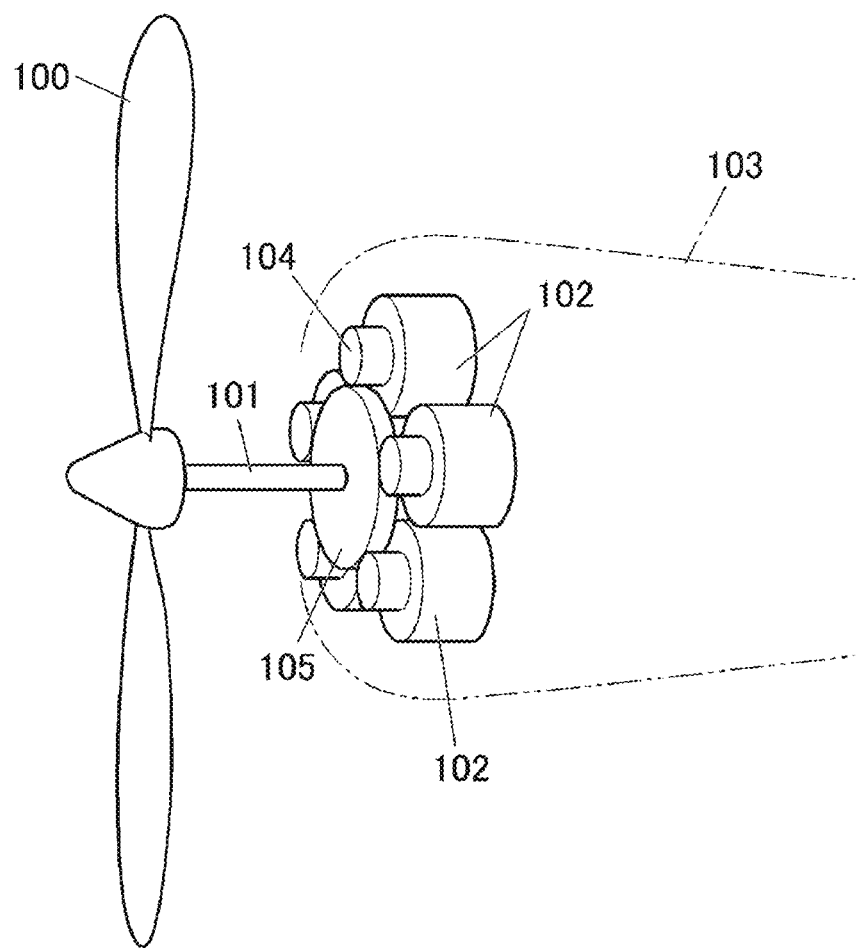
FIG. 10 illustrates a state in which a plurality of electric motors are radially disposed around a propeller shaft.

For example, when the above-described radial arrangement is applied to the arrangement of a plurality of electric motors in a redundant propulsion device of an electric aircraft, for example, as FIG. 10 illustrates, a plurality of electric motors 102 are disposed around a propeller shaft 101 of a propeller 100.

In such a case, when the plurality of electric motors 102 are radially disposed so that first gears 104 attached to output shafts of the respective electric motors 102 engage a second gear 105 attached to the propeller shaft 101 at a location in the longitudinal direction of the propeller shaft 101, a large number of electric motors 102 are to be disposed around the propeller shaft 101, and the circumscribed circle diameter of the plurality of electric motors 102 increases.

Thus, the size of a nacelle 103 configured to accommodate such electric motors 102 and the like increases. If the size of the nacelle 103 increases, the air resistance caused by the nacelle 103 increases accordingly, and the drag against the electric aircraft increases.

Figure 11:
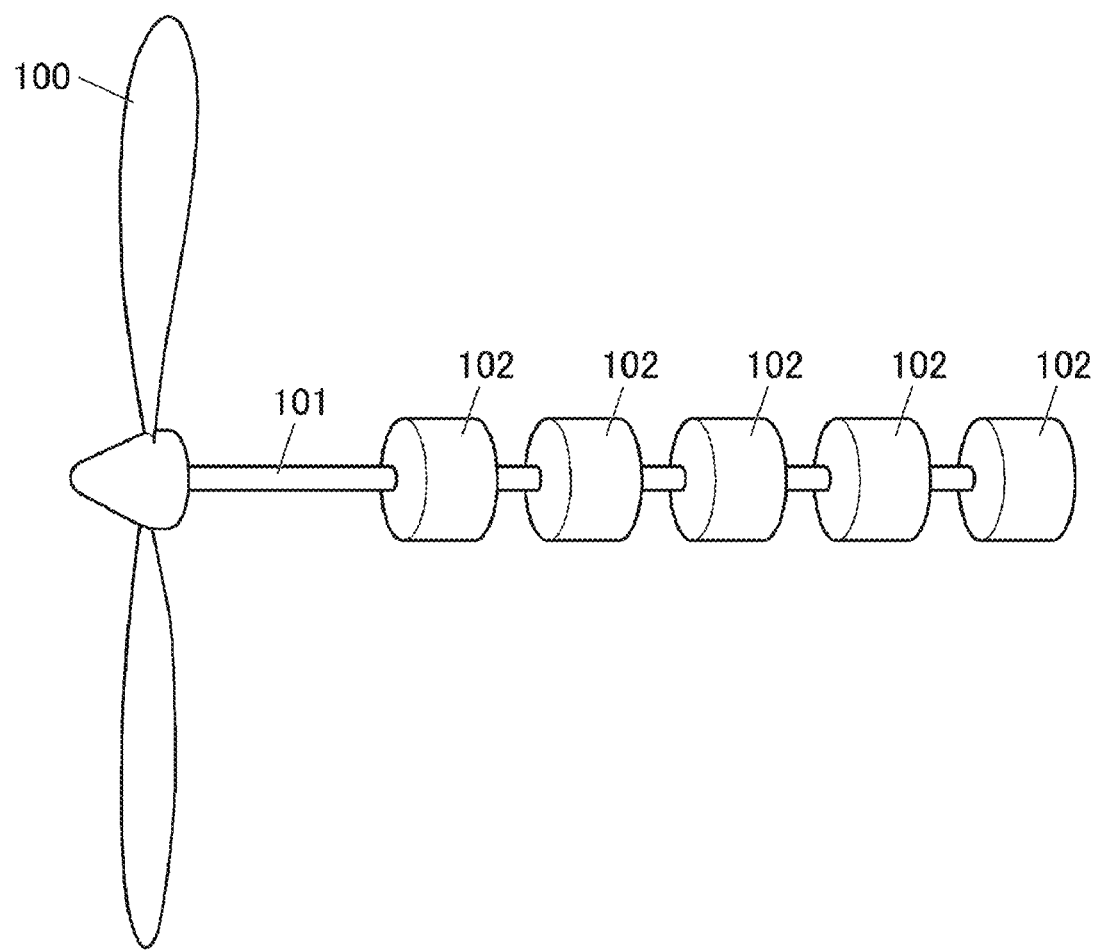
FIG. 11 illustrates a state in which the plurality of electric motors are axially disposed along the propeller shaft.

In contrast, when the above-described axial arrangement is applied to the arrangement of a plurality of electric motors in a redundant propulsion device of an electric aircraft, as FIG. 11 illustrates, any one of the electric motors 102 at an aft position with respect to any other one of the electric motors 102 (that is, a position farther from the propeller 100) directly receives the heat that is generated by any other one of the electric motors 102 at a fore position (that is, at a position closer to the propeller 100) and that is carried by the air flow generated by rotation of the propeller 100. Thus, the cooling efficiency of the electric motors 102 in the aft region decreases.

Consequently, the drive performance of the electric motors 102 in the aft region may decrease, and, in some cases, the electric motors 102 in the aft region may even be damaged by such heat.

It is desirable to provide a redundant propulsion device capable of appropriately cooling a plurality of electric motors without increasing the size of a nacelle and to provide an electric aircraft including the redundant propulsion device.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, the nose side of the electric aircraft is referred to as a fore region, and the tail side is referred to as an aft region.

Figure 1:
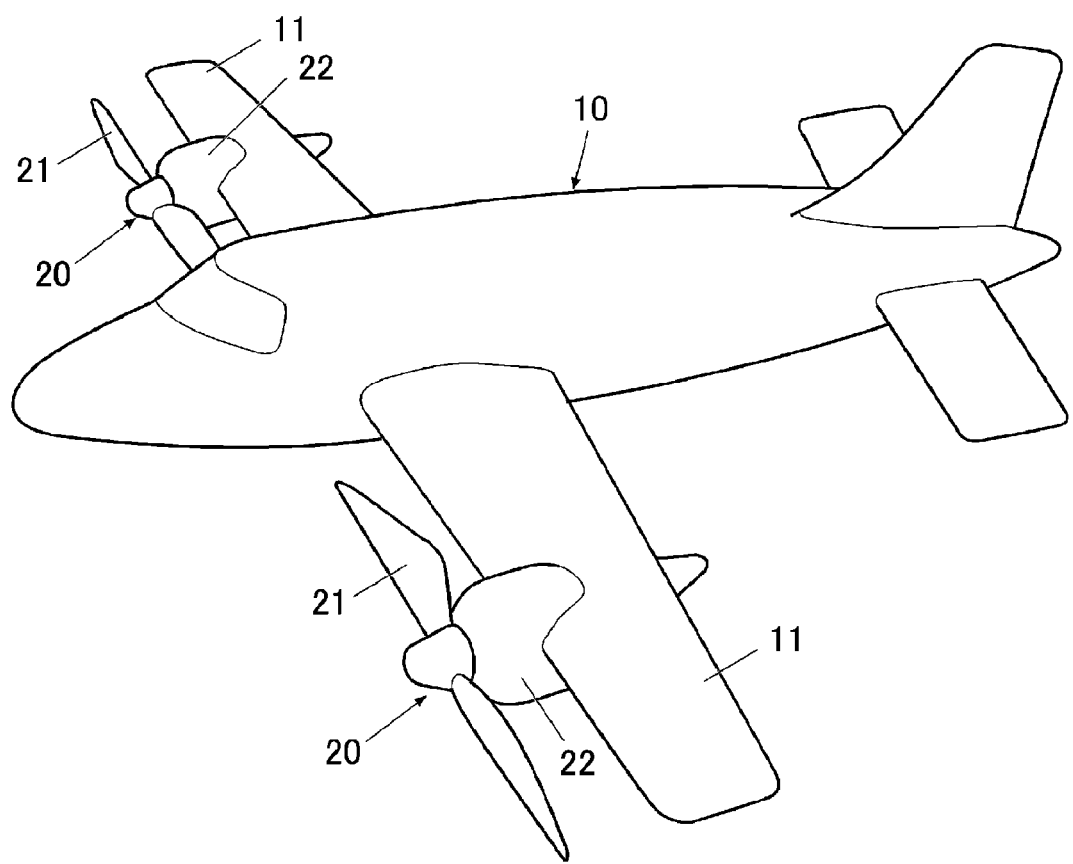
FIG. 1 is an external perspective view of an example of an electric aircraft.

FIG. 1 is an external perspective view of an example of the electric aircraft.

An electric aircraft 10 includes a redundant propulsion device 20 that is attached to a corresponding wing 11 and that includes constituents such as a propeller 21, a nacelle 22, and a plurality of electric motors 23, which will be described below. The electric aircraft 10 obtains a propulsive force generated by driving each propeller 21 by using the plurality of electric motors 23. Although FIG. 1 illustrates a case in which the redundant propulsion device 20 is attached to the corresponding fixed wing, the location of the redundant propulsion device 20 is not limited to the fixed wing. For example, the redundant propulsion device 20 may be attached to a foldable wing or the like or may be attached to a variable wing such as a tilt wing. In addition, the electric aircraft 10 may be an uncrewed aircraft.

Figure 2A:
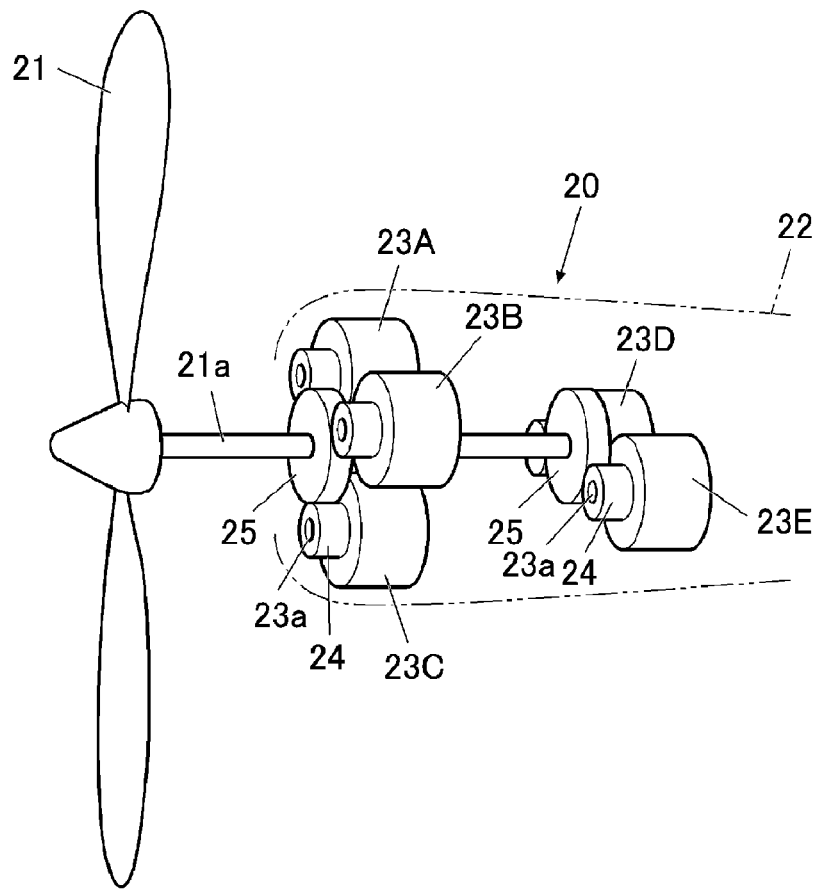
FIG. 2A and FIG. 2B are a perspective view and a front view, respectively, of a configuration example of a redundant propulsion device according to an embodiment of the disclosure.
Figure 2B:
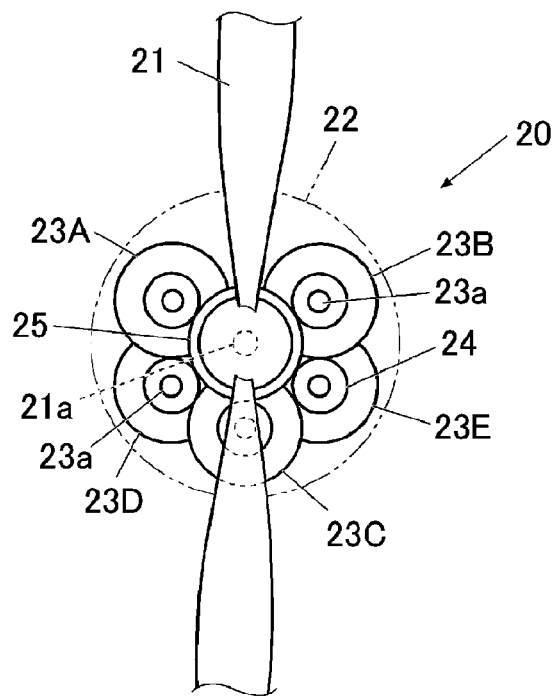

FIGS. 2A and 2B are a perspective view and a front view, respectively, of a configuration example of the redundant propulsion device according to the present embodiment.

In the redundant propulsion device 20 according to the present embodiment, the electric motors 23 configured to drive the corresponding propeller 21 are disposed in a redundant manner, and a plurality of electric motors 23A to 23E drive the propeller 21.

In one embodiment, in the configuration example, three electric motors 23A to 23C are disposed in the fore region in the nacelle 22 of the redundant propulsion device 20, and two electric motors 23D and 23E are disposed in the aft region in the nacelle 22. Each electric motor 23 is disposed so that first gears 24 attached to output shafts 23*a* of the respective electric motor 23 engage either one of second gears 25 fixed to a fore part of a propeller shaft 21*a* and fixed to an aft part of the propeller shaft 21*a*.

As described above, in the configuration example, such assemblies of the electric motors 23 are disposed with respect to the propeller shaft 21*a* at a plurality of locations in the longitudinal direction of the propeller shaft 21*a* (that is, the fore-aft direction) and disposed around the propeller shaft 21*a* at the respective locations.

Figure 3A:
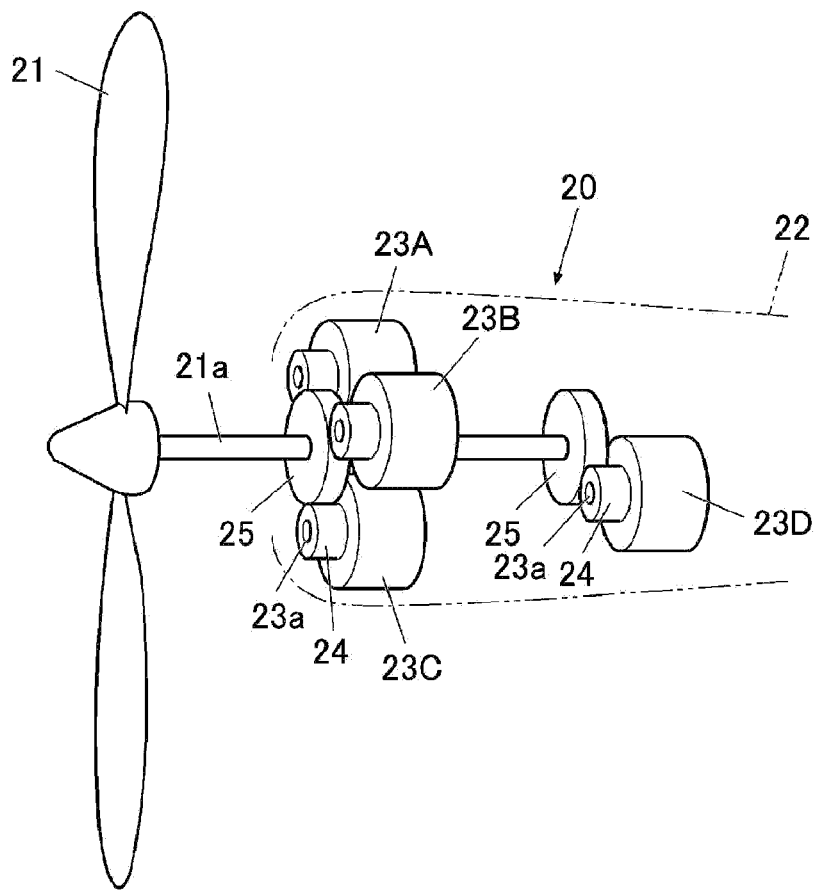
FIG. 3A and FIG. 3B are a perspective view and a front view, respectively, of another configuration example of the redundant propulsion device according to the embodiment.

Instead of the above-described configuration example in which the assemblies of the electric motors 23 are disposed at a plurality of locations in the longitudinal direction of the propeller shaft 21*a* of the propeller 21, for example, as FIG. 3A illustrates, it is also possible that, when a plurality of electric motors 23 are disposed with respect to the propeller shaft 21*a* of the propeller 21 at a plurality of locations in the longitudinal direction of the propeller shaft 21*a*, a single electric motor 23 (in FIG. 3A, the electric motor 23D) engages the second gear 25 that is fixed to the propeller shaft 21*a* at one location.

Although FIG. 3A illustrates the case in which four electric motors 23 are provided, the same applies to a case in which the number of electric motors 23 is any number other than four. In addition, although FIG. 3A illustrates the case in which the single electric motor 23 is disposed at one of the plurality of locations in the longitudinal direction of the propeller shaft 21*a*, it is also possible to dispose a single electric motor 23 at each of the plurality of locations.

As described above, in the redundant propulsion device 20 according to the present embodiment, the plurality of electric motors 23 are disposed with respect to the propeller shaft 21*a* of the propeller 21 so that, around the propeller shaft 21*a*, at least one of the plurality of electric motors 23 is disposed at each of the plurality of locations in the longitudinal direction of the propeller shaft 21*a* (that is, the fore-aft direction).

Each electric motor 23 is driven by a corresponding controller, which is not illustrated, and the propeller 21 is rotationally driven around the propeller shaft 21*a* by driving each electric motor 23 to rotate the propeller shaft 21*a*.

Figure 3B:
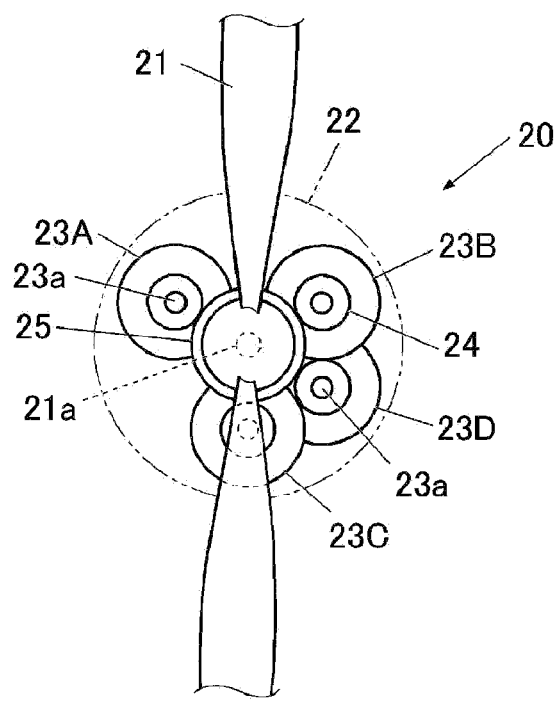

As FIGS. 2B and 3B illustrate, in the redundant propulsion device 20 according to the present embodiment, the plurality of electric motors 23 are disposed at positions such that the output shaft 23*a* of each of the plurality of electric motors 23 does not overlap the output shaft 23*a* of any other one of the plurality of electric motors 23 as viewed in the longitudinal direction of the propeller shaft 21*a* from the propeller 21 (that is, as viewed from the fore end to the aft end).

Next, workings and effects of the redundant propulsion device 20 and the electric aircraft 10 including the redundant propulsion device 20 according to the present embodiment will be described. Hereinafter, although the configuration example illustrated in FIGS. 2A and 2B will be described, the following description also applies to such a configuration example illustrated in FIGS. 3A and 3B.

For example, in the configuration example illustrated in FIG. 2A, the electric motors 23 are dispersedly disposed, that is, three electric motors 23 are radially disposed in the fore region, and two electric motors 23 are radially disposed in the aft region. Compared with the case in which five electric motors 102 are radially disposed at a single location in the longitudinal direction of the propeller shaft 101 as FIG. 10 illustrates, when three (or two) electric motors 23 are radially disposed, the diameter of the second gear 25 can be reduced because the electric motors 23 do not interfere with each other even when the diameter of the second gear 25 is reduced.

Accordingly, the circumscribed circle diameter of the three (or two) electric motors 23 that are disposed around the second gear 25 can be reduced, and it is thus possible for the size of the nacelle 22 configured to accommodate such electric motors 23 and the like to be kept small.

Therefore, the redundant propulsion device 20 and the electric aircraft 10 according to the present embodiment can suppress an increase in the size of the nacelle 22 configured to accommodate the electric motors 23 and the like.

In the redundant propulsion device 20 and the electric aircraft 10 according to the present embodiment, as described above, the plurality of electric motors 23 of the redundant propulsion device 20 are disposed at positions such that the output shaft 23a of each of the plurality of electric motors 23 does not overlap the output shaft 23a of any other one of the electric motors 23 as viewed in the longitudinal direction of the propeller shaft 21a from the propeller 21.

Thus, even when the heat of the electric motors 23 in the fore region flows toward the aft end while being carried by the air flow generated by rotation of the propeller 21, the electric motors 23 in the aft region do not receive the heat directly.

That is, the electric motors 23 in the aft region do not receive the heat of the electric motors 23 in the fore region or receive a part of the heat, even if receiving the heat.

Thus, the air flow generated by rotation of the propeller 21 can cool the electric motors 23 in the aft region in addition to the electric motors 23 in the fore region, and the plurality of electric motors 23 can be appropriately cooled.

As described above, by using the air flow generated by rotation of the propeller 21, the redundant propulsion device 20 and the electric aircraft 10 including the redundant propulsion device 20 are capable of appropriately cooling the plurality of electric motors 23 configured to drive the propeller 21 without increasing the size of the nacelle 22.

Therefore, it is possible to cool each electric motor 23 and to suppress an increase in the air resistance caused by the nacelle 22; thus, an increase in the drag against the electric aircraft 10 can be appropriately suppressed.

In the configuration example illustrated in FIGS. 2A and 2B, the case in which the redundant propulsion device 20 includes five electric motors 23 is described, while, in the configuration example illustrated in FIGS. 3A and 3B, the case in which the redundant propulsion device 20 includes four electric motors 23 is described. The optimum number of electric motors 23 in the redundant propulsion device 20 can be obtained as below, for example.

That is, when the ratio of the motor output of the electric motor 23 at a short-time rating to the motor output of the electric motor 23 at a continuous rating is a, the number of electric motors 23 in a case of the short-time rating is obtained by $1/(a-1)$.

The optimum number of electric motors 23 in the redundant propulsion device 20 can be obtained by adding 1 representing a single electric motor 23 that is assumed to malfunction and come to a stop, to the obtained number of electric motors 23. When the allowable number of electric motors 23 that are assumed to malfunction is up to 2, 2 is added to $1/(a-1)$.

For example, when the above-described ratio a is 1.25, 4 is obtained by $1/(a-1)$. When the number of electric motors 23 that are assumed to malfunction is 1, the optimum number of electric motors 23 in the redundant propulsion device 20 is 5, which is obtained by 4+1.

Therefore, the number of electric motors 23 in the redundant propulsion device 20 can be determined by using, for example, the ratio a of the motor output of the electric motor 23 that is used in the redundant propulsion device 20 at the short-time rating to the motor output of the electric motor 23 at the continuous rating.

Thus, depending on the performance of the electric motor 23, that is, for example, the above-described ratio a, the number of electric motors 23 in the redundant propulsion device 20 may be 5, as FIGS. 2A and 2B illustrate, or 4, as FIGS. 3A and 3B illustrate, but can be any number other than 4 or 5.

Figure 4A:
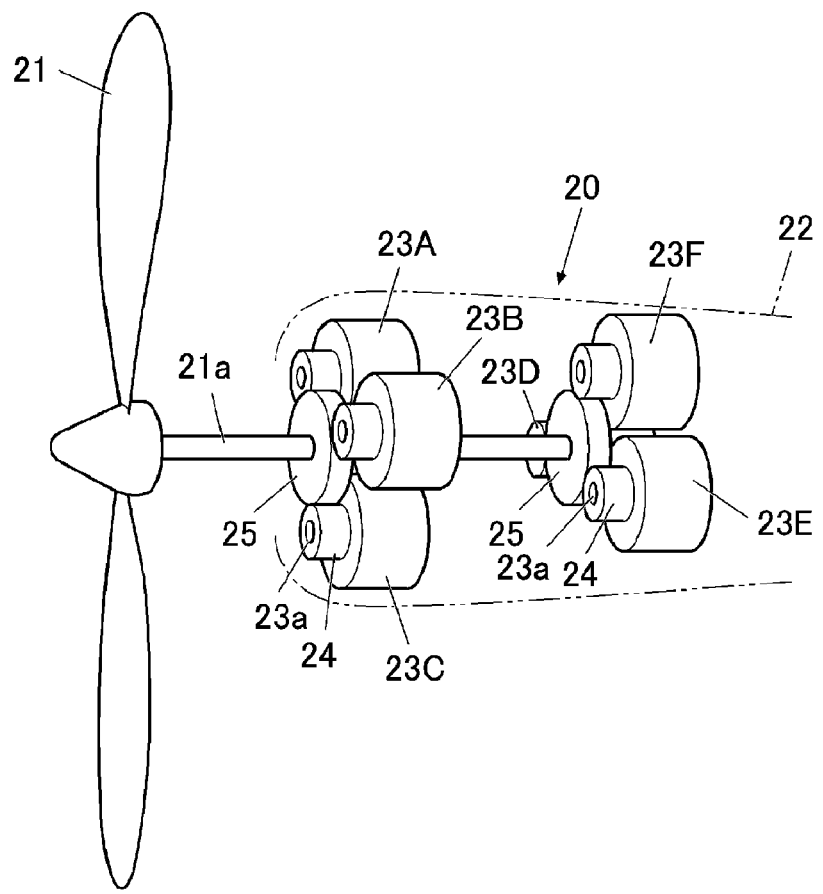
FIG. 4A and FIG. 4B are a perspective view and a front view, respectively, of still another configuration example of the redundant propulsion device according to the embodiment.
Figure 4B:
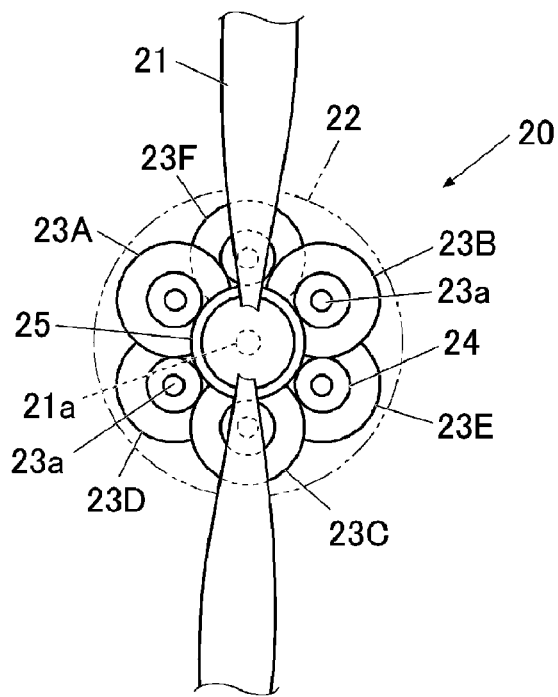

As FIGS. 4A and 4B illustrate, for example, when the number of electric motors 23 in the redundant propulsion device 20 is six, a plurality of electric motors 23A to 23F can also be disposed with respect to the propeller shaft 21a of the propeller 21 so that, around the propeller shaft 21a, assemblies of the electric motors 23 are disposed at a plurality of locations in the longitudinal direction of the propeller shaft 21a and can be disposed at positions such that the output shaft 23a of each of the plurality of electric motors 23 does not overlap the output shaft 23a of any other one of the electric motors 23 as viewed in the longitudinal direction of the propeller shaft 21a from the propeller 21.

Thus, as with the configuration examples illustrated in FIGS. 2A and 2B and FIGS. 3A and 3B, in this case, the plurality of electric motors 23 configured to drive the propeller 21 can also be appropriately cooled without increasing the size of the nacelle 22.

Figure 5A:
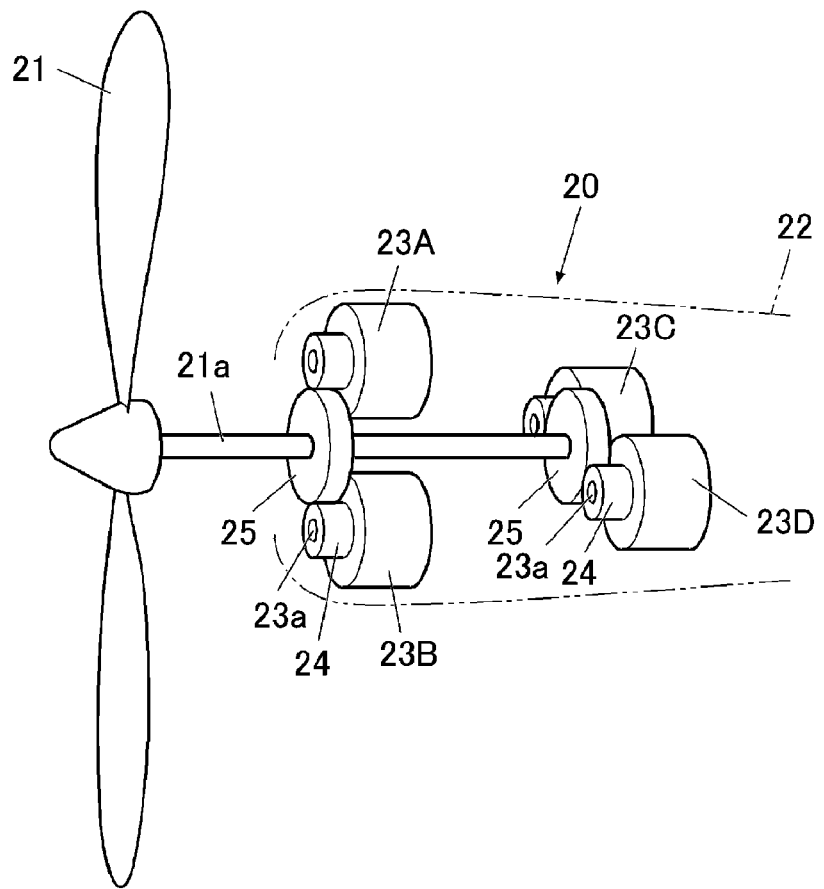
FIG. 5A and FIG. 5B are a perspective view and a front view, respectively, of yet another configuration example of the redundant propulsion device according to the embodiment.
Figure 5B:
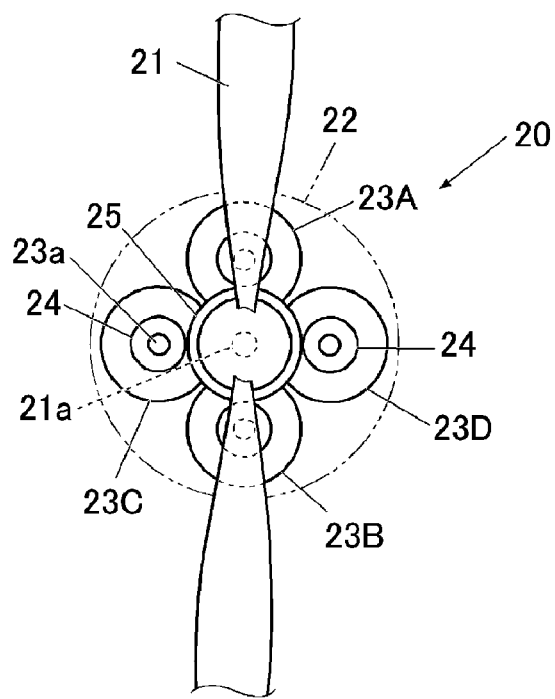

In addition, as described above, even when the number of electric motors 23 in the redundant propulsion device 20 is, for example, four, as FIGS. 5A and 5B illustrates, the plurality of electric motors 23A to 23D can also be disposed with respect to the propeller shaft 21a of the propeller 21 so that, around the propeller shaft 21a, assemblies of the electric motors 23 are disposed at a plurality of locations in the longitudinal direction of the propeller shaft 21a and can be disposed at positions such that the output shaft 23a of each of the plurality of electric motors 23 does not overlap the output shaft 23a of any other one of the electric motors 23 as viewed in the longitudinal direction of the propeller shaft 21a from propeller 21.

Thus, as with each of the above-described cases, in this case, the plurality of electric motors 23 configured to drive the propeller 21 can also be appropriately cooled without increasing the size of the nacelle 22.

Figure 6A:
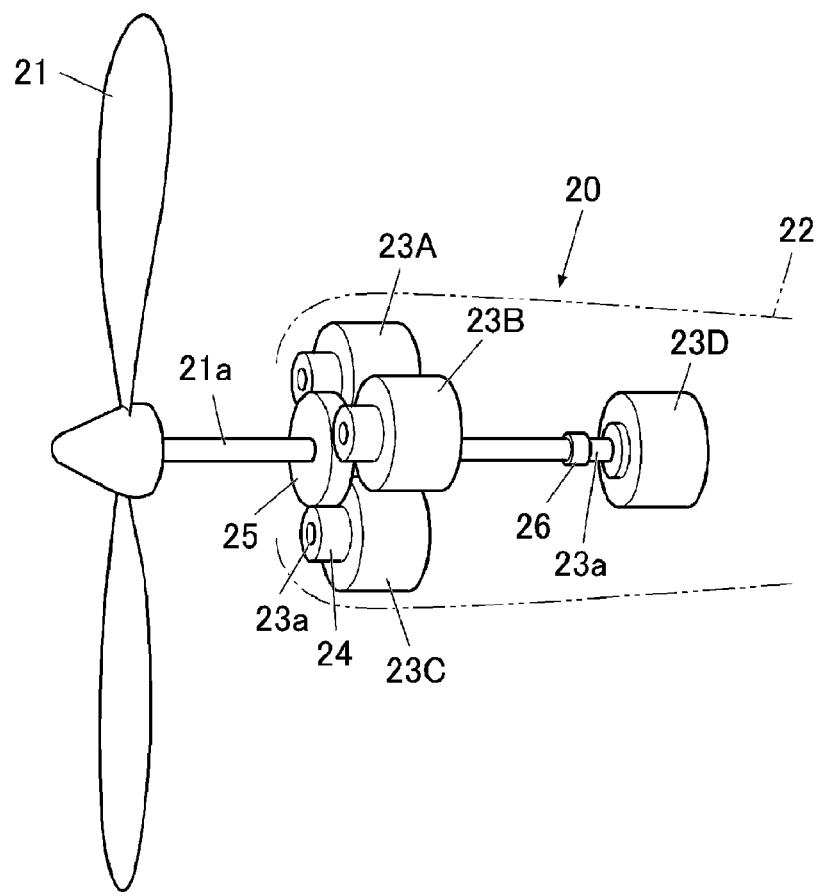
FIG. 6A and FIG. 6B are a perspective view and a front view, respectively, of still yet another configuration example of the redundant propulsion device according to the embodiment.
Figure 6B:
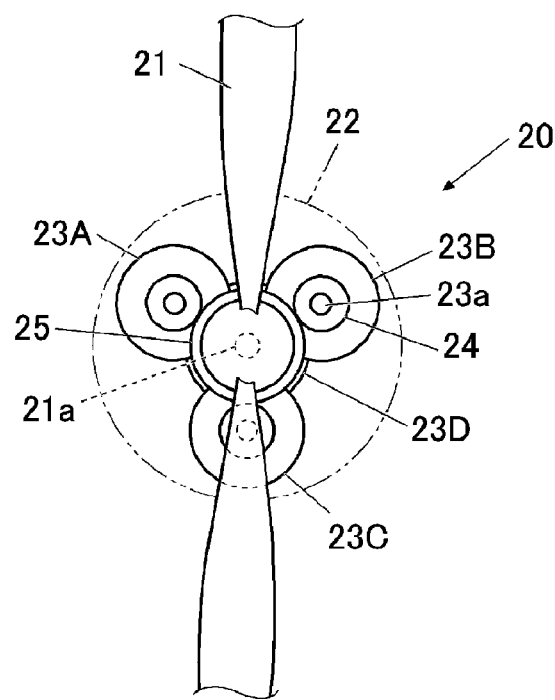

When the number of electric motors 23 in the redundant propulsion device 20 is, for example, four, an alternative configuration is also possible. As FIGS. 6A and 6B illustrate, for example, a single electric motor 23 is provided in the aft region. That is, at one of the plurality of locations in the longitudinal direction of the propeller shaft 21a, the output shaft 23a of the single electric motor 23D is directly coupled to the propeller shaft 23a via a joint 26 or the like (that is, coupled to the propeller shaft 21a without a first gear 24 and a second gear 25).

Even if the redundant propulsion device 20 is configured as described above, the output shaft 23a of the electric motor 23D does not overlap the output shaft 23a of any other one of the electric motors 23A to 23C as viewed in the longitudinal direction of the propeller shaft 21a from the propeller 21. Thus, as with each of the above-described cases, the redundant propulsion device 20 can appropriately cool the plurality of electric motors 23 configured to drive the propeller 21 without increasing the size of the nacelle 22.

Although FIGS. 6A and 6B illustrate the case in which the number of electric motors 23 is four, the same applies to a case in which the number of electric motors 23 is any number other than four.

In addition, although FIGS. 2A and 2B and FIGS. 3A and 3B illustrate the case in which the number of electric motors 23 that are disposed in the fore region in the nacelle 22 of the redundant propulsion device 20 is larger than the number of electric motors 23 that are disposed in the aft region, the number of electric motors 23 in the aft region can be larger than the number of electric motors 23 in the fore region.

In the above-described embodiment, the case in which, due to the air flow generated by rotation of the propeller 21, air flows into the nacelle 22 and the air is sent to the plurality of electric motors 23 is described.

However, for example, in the nacelle 22 configured to accommodate the above-described plurality of electric motors 23, it is possible to provide air guiding plates configured to guide the air that has flowed through air inlets to the respective electric motors 23.

Hereinafter, the air guiding plates and the like that are provided in the nacelle 22 of the redundant propulsion device 20 will be described.

Although the following description is based on a configuration in which a plurality of electric motors 23 of the redundant propulsion device 20 are disposed in a form illustrated in FIGS. 2A and 2B, the following description also applies to a case in which the electric motors 23 are disposed in a different form.

Figure 7:
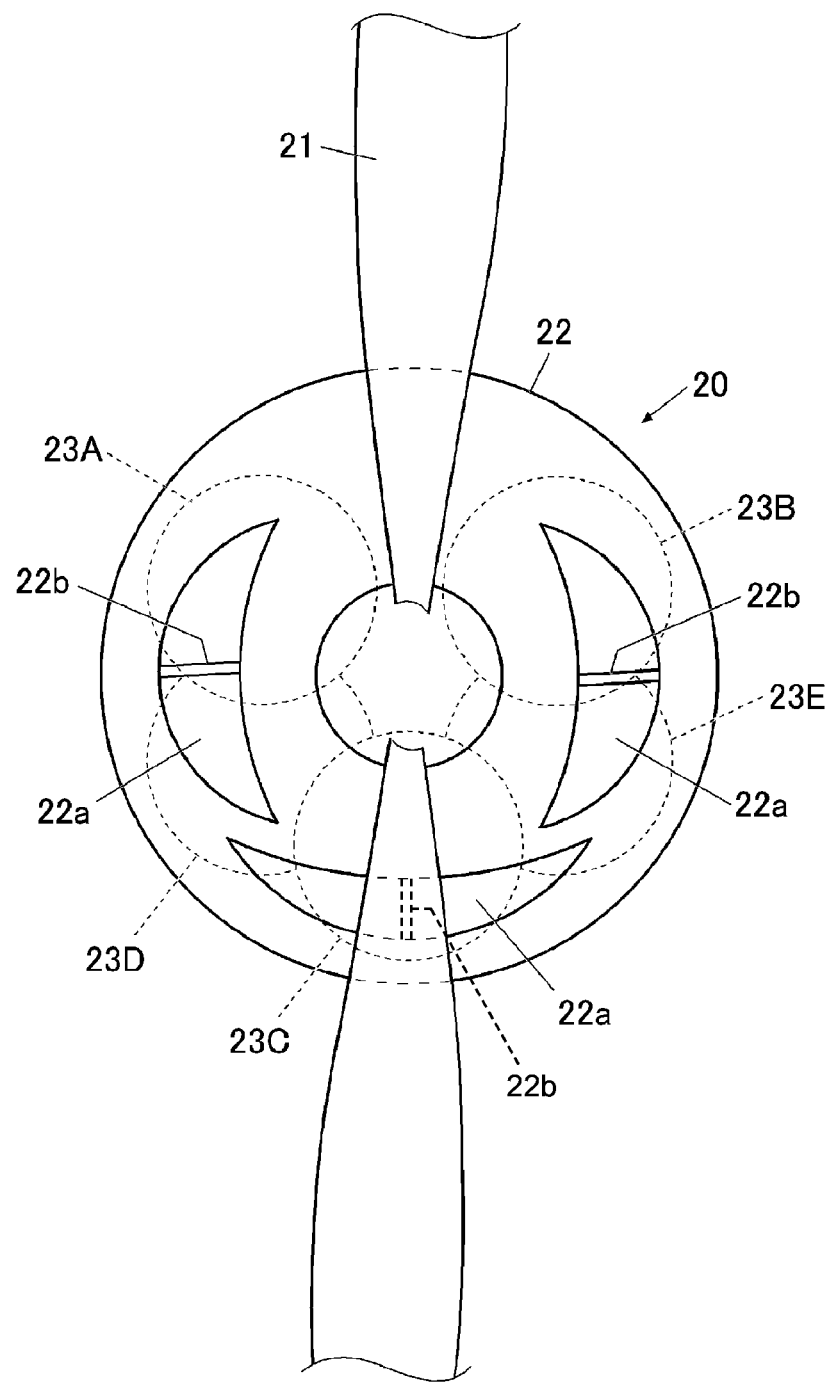
FIG. 7 is a front view of a configuration example of an air inlet and an air guiding plate provided in a nacelle of the redundant propulsion device.

As FIG. 7 illustrates, air inlets 22a are provided in a front face of the nacelle 22 of the redundant propulsion device 20. The air inlets 22a are configured to pass the air flow generated by rotation of the propeller 21 into the nacelle 22.

In addition, air guiding plates 22b are provided in the nacelle 22. The air guiding plates 22b are configured to guide the air that has flowed into the nacelle 22 through the air inlets 22a to the respective electric motors 23A to 23E.

The corresponding air guiding plate 22b guides the air that has flowed through the upper part of the air inlet 22a positioned on the left side of the figure to the electric motor 23A and also guides the air that has flowed through the lower part of the air inlet 22a positioned on the left side of the figure to the electric motor 23D.

Similarly, the corresponding air guiding plate 22b guides the air that has flowed through the upper part of the air inlet 22a positioned on the right side of the figure to the electric motor 23B and also guides the air that has flowed through the lower part of the air inlet 22a positioned on the right side of the figure to the electric motor 23E.

Moreover, the corresponding air guiding plate 22b guides the air that has flowed through the air inlet 22a positioned on the lower side of the figure to the electric motor 23C.

Therefore, each of the electric motors 23A to 23E can be cooled due to the configuration in which the air guiding plates 22b guide the air that has flowed through the air inlets 22a to the respective electric motors 23A to 23E.

Figure 9A:
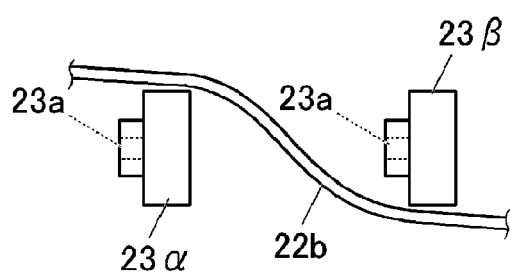
FIG. 9A and FIG. 9B illustrate the extent of the curve of the respective air guiding plates.

When the air guiding plates 22b are provided in the nacelle 22 of the redundant propulsion device 20 and if, for example, as FIG. 9A illustrates, an electric motor 23α in the fore region and an electric motor 23β in the aft region are disposed at positions such that output shafts 23α of the electric motors 23α and 23β overlap each other as viewed from the fore end toward the aft end, the air guiding plate 22b is to be curved greatly so that the electric motor 23β in the aft region does not receive the heat of the electric motor 23α in the fore region.

In such a configuration, however, there is a possibility that the greatly curved air guiding plate 22b restricts air from flowing smoothly in the nacelle 22, the air resistance in the nacelle 22 increases, and the drag against the electric aircraft 10 increases.

Figure 9B:
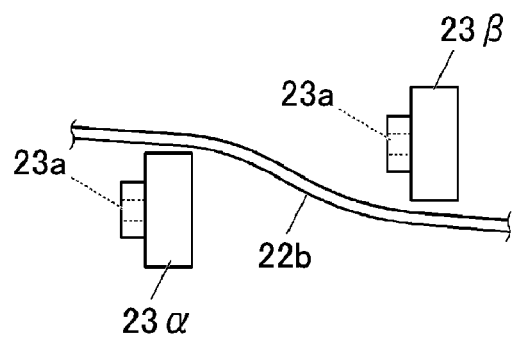

In contrast, as with the present embodiment illustrated in FIG. 9B, when the electric motor 23α in the fore region and the electric motor 23β in the aft region are disposed at positions such that the output shafts 23a of the electric motors 23α and 23β do not overlap each other as viewed from the fore end toward the aft end, the electric motor 23β in the aft region can avoid receiving the heat of the electric motor 23α in the fore region, even if the curve of the air guiding plate 22b is not very great.

Thus, in the present embodiment, the air resistance in the nacelle 22 decreases because air flows smoothly along the air guiding plate 22b in the nacelle 22. Thus, it is possible to appropriately suppress an increase in the drag against the electric aircraft 10.

It is to be understood that the present disclosure is not limited to the above-described embodiment and the like and enabled to be modified as appropriate without departing from the spirit of the present disclosure.

For example, in the above-described embodiment, although the case in which the redundant propulsion device 20 is attached to the corresponding wing 11 of the electric aircraft 10 is described (refer to FIG. 1), the redundant propulsion device 20 may be disposed at the nose or the like of the electric aircraft 10.

For example, in the above-described embodiment, the case in which a plurality of electric motors 23 are disposed at two locations, which are a location closer to the propeller 21 (that is, in the fore region) and a location farther from the propeller 21 (that is, in the aft region) as viewed in the longitudinal direction of the propeller shaft 21a from the propeller 21, is described. However, a plurality of electric motors 23 may be disposed at three or more locations.

Figure 8:
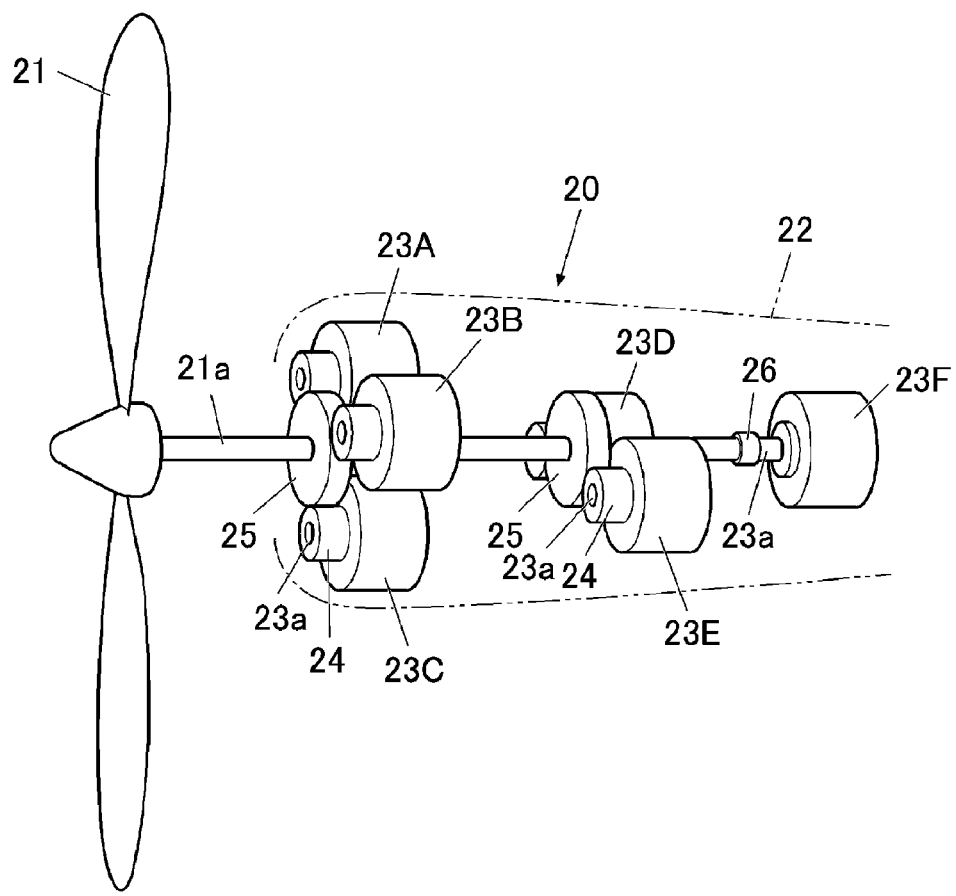
FIG. 8 is a perspective view of a further configuration example of the redundant propulsion device according to the embodiment.

In such a case, for example, as FIG. 8 illustrates, it is also possible to dispose a plurality of electric motors 23 at three or more locations in the longitudinal direction of the propeller shaft 21a so that a larger number of electric motors 23 are disposed at a location closer to the propeller 21 than at a location farther from the propeller 21.

Although FIG. 8 illustrates a case of three locations, the number of locations may be four or more.

Moreover, although FIG. 8 illustrates a case in which one of the plurality of electric motors 23 farthest from the propeller 21 is the one of the electric motors 23 that is directly coupled to the propeller shaft 21a (that is, coupled to the propeller shaft 21a without a first gear 24 and a second gear 25), the electric motor 23 can be attached to the propeller shaft 21a via a first gear 24 and a second gear 25 as with, for example, the electric motor 23D in the aft region illustrated in FIG. 3B.

Furthermore, in the case in which a plurality of electric motors 23 are disposed at three or more locations in the longitudinal direction of the propeller shaft 21a, the number of electric motors 23 at a location in the aft region may also be larger than the number of electric motors 23 at a location in the fore region.

In addition, when the first gears 24 is attached to the output shaft 23a of the corresponding electric motor 23 as in FIGS. 2A, 2B, and the like or when the output shaft 23a of the corresponding electric motor 23 is attached to the propeller shaft 21a as FIGS. 6A and 6B illustrate, although illustration is omitted, such attachment is enabled, for example, via a one-way clutch.

If such a configuration is adopted, the output of the electric motor 23 is transmitted from the output shaft 23a to either one of the first gear 24 and the propeller shaft 21a when the propeller 21 is rotationally driven by driving the electric motor 23. However, if the electric motor 23 stops working due to malfunction or the like, either one of the first gear 24 and the propeller shaft 21a comes to idly rotate with respect to the output shaft 23a of the electric motor 23.

If either one of the first gear 24 and the propeller shaft 21a is fixed to the output shaft 23a, there is a possibility that the electric motor 23 stops working due to malfunction or the like, the output shaft 23a that has stopped rotating inhibits either one of the first gear 24 and the propeller shaft 21a from rotating, and drive efficiency brought by each electric motor 23 decreases. However, in the case in which the one-way clutch is provided, even if the electric motor 23 stops working due to malfunction or the like and the output shaft 21a stops rotating, either one of the first gear 24 and the propeller shaft 21a just idly rotates and is not inhibited from rotating.

Therefore, even if one (or two or the like) of the plurality of electric motors 23 stops working due to malfunction or the like, it is possible to appropriately suppress a decrease in drive efficiency, which is brought by each electric motor 23, caused by such a stop of the electric motor 23.

The invention claimed is:

1. A redundant propulsion device comprising:
   a propeller; and
   a plurality of electric motors configured to drive the propeller,
   wherein the electric motors are disposed with respect to a propeller shaft of the propeller so that, around the propeller shaft, at least one of the plurality of electric motors is disposed at each of a plurality of locations in a longitudinal direction of the propeller shaft, and
   wherein the electric motors are disposed at positions such that an output shaft of each of the plurality of electric motors does not overlap an output shaft of any other one of the electric motors as viewed in the longitudinal direction of the propeller shaft from the propeller.

2. A redundant propulsion device comprising:
   a propeller; and
   electric motors configured to drive the propeller,
   wherein the electric motors are disposed with respect to a propeller shaft of the propeller at locations in a longitudinal direction of the propeller shaft, one of electric motors is directly coupled to the propeller shaft of the propeller at one of the locations, and at least one of the electric motors is disposed around the propeller shaft at another one of the locations, and
   wherein the electric motors are disposed at positions such that an output shaft of each of the electric motors does not overlap an output shaft of any other one of the electric motors as viewed in the longitudinal direction of the propeller shaft from the propeller.

3. The redundant propulsion device according to claim 1, wherein the locations are two locations.

4. The redundant propulsion device according to claim 2, wherein the locations are two locations.

5. The redundant propulsion device according to claim 3, wherein a number of the plurality of electric motors that are disposed at one of the locations closer to the propeller is larger than or equal to a number of the electric motors which are disposed at the other one of the locations farther from the propeller.

6. The redundant propulsion device according to claim 4, wherein a number of the electric motors that are disposed at one of the locations closer to the propeller is larger than or equal to a number of the electric motors which are disposed at the other one of the locations farther from the propeller.

7. The redundant propulsion device according to claim 1, wherein the locations are three or more locations, and
   wherein the electric motors are disposed so that a larger number of the electric motors are disposed at a location closer to the propeller than at a location farther from the propeller.

8. The redundant propulsion device according to claim 2, wherein the locations are three or more locations, and
   wherein the electric motors are disposed so that a larger number of the electric motors are disposed at a location closer to the propeller than at a location farther from the propeller.

9. The redundant propulsion device according to claim 2, wherein the locations are two or more locations, and
   wherein, as viewed in the longitudinal direction of the propeller shaft from the propeller, one of the electric motors farthest from the propeller is the one of the electric motors which is directly coupled to the propeller shaft of the propeller.

10. The redundant propulsion device according to claim 1, wherein the electric motors are accommodated in a nacelle, and
    wherein, in the nacelle, an air guiding plate configured to guide air that flows into the nacelle through an air inlet to each of the electric motors.

11. The redundant propulsion device according to claim 2, wherein the electric motors are accommodated in a nacelle, and
    wherein, in the nacelle, an air guiding plate configured to guide air that flows into the nacelle through an air inlet to each of the electric motors.

12. The redundant propulsion device according to claim 3, wherein the electric motors are accommodated in a nacelle, and
    wherein, in the nacelle, an air guiding plate configured to guide air that flows into the nacelle through an air inlet to each of the electric motors.

13. The redundant propulsion device according to claim 4, wherein the electric motors are accommodated in a nacelle, and
    wherein, in the nacelle, an air guiding plate configured to guide air that flows into the nacelle through an air inlet to each of the electric motors.

14. An electric aircraft comprising:
    the redundant propulsion device according to claim 1.

15. An electric aircraft comprising:
    the redundant propulsion device according to claim 2.

16. An electric aircraft comprising:
    the redundant propulsion device according to claim 3.

17. The redundant propulsion device according to claim 1, wherein each of the electric motors is disposed so that first gears attached to output shafts of the electric motors engage second gears, the second gears being fixed to a fore part of the propeller shaft and to an aft part of the propeller shaft.

18. The redundant propulsion device according to claim 2, wherein each of the electric motors is disposed so that first gears attached to output shafts of the electric motors engage second gears, the second gears being fixed to a fore part of the propeller shaft and to an aft part of the propeller shaft.

19. The redundant propulsion device according to claim 17, wherein at least one of i) an attachment of each of the first gears to an output shaft of a corresponding electric motor of the electric motors and ii) an attachment of the output shaft of the corresponding electric motor to the propeller shaft is via a clutch.

20. The redundant propulsion device according to claim 18, wherein at least one of i) an attachment of each of the first gears to an output shaft of a corresponding electric motor of the electric motors and ii) an attachment of the output shaft of the corresponding electric motor to the propeller shaft is via a clutch.

* * * * *